US007624918B2

(12) United States Patent
Sweeney et al.

(10) Patent No.: US 7,624,918 B2
(45) Date of Patent: Dec. 1, 2009

(54) WIRELESS IDENTIFICATION BASED DISPLAY

(75) Inventors: William R. Sweeney, Richmond, VA (US); Ken Forster, Atlanta, GA (US); Joe Amado, Midlothian, VA (US); Quazi Towhidul Islam, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 358 days.

(21) Appl. No.: 11/049,871

(22) Filed: Feb. 4, 2005

(65) Prior Publication Data

US 2006/0175400 A1 Aug. 10, 2006

(51) Int. Cl.

| | |
|---|---|
| ***G06K 7/10*** | (2006.01) |
| ***G06K 19/06*** | (2006.01) |
| ***G06K 15/00*** | (2006.01) |
| ***G06K 17/00*** | (2006.01) |
| ***G06K 19/00*** | (2006.01) |
| ***G06F 19/00*** | (2006.01) |
| ***G06Q 30/00*** | (2006.01) |
| ***G06Q 90/00*** | (2006.01) |
| ***G08B 13/14*** | (2006.01) |
| ***H04Q 5/22*** | (2006.01) |

(52) U.S. Cl. .................. 235/378; 235/462.01; 235/383; 235/487; 235/375; 235/385; 340/572.1; 340/10.32; 340/10.3

(58) Field of Classification Search ............ 235/462.01, 235/385, 383, 487, 375; 705/16, 64; 340/572.01, 340/10.3, 10.32

See application file for complete search history.

(56) References Cited

U.S. PATENT DOCUMENTS

| | | | | |
|---|---|---|---|---|
| 5,029,183 | A * | 7/1991 | Tymes | 375/141 |
| 5,294,782 | A * | 3/1994 | Kumar | 235/380 |
| 5,345,071 | A * | 9/1994 | Dumont | 235/383 |
| 5,382,784 | A * | 1/1995 | Eberhardt | 235/462.46 |
| 5,406,275 | A * | 4/1995 | Hassett et al. | 340/933 |
| 5,424,524 | A * | 6/1995 | Ruppert et al. | 705/8 |
| 5,465,397 | A * | 11/1995 | Pickert | 455/62 |
| 5,640,002 | A * | 6/1997 | Ruppert et al. | 235/462.46 |
| 5,668,803 | A * | 9/1997 | Tymes et al. | 370/312 |
| 5,898,383 | A * | 4/1999 | Forsythe | 340/5.91 |
| 5,902,986 | A * | 5/1999 | Barkan et al. | 235/462.25 |
| 5,978,772 | A * | 11/1999 | Mold | 705/16 |
| 5,984,182 | A * | 11/1999 | Murrah et al. | 235/383 |
| 6,401,074 | B1 | 6/2002 | Sleeper | |
| 6,422,464 | B1 | 7/2002 | Terranova | |
| 6,550,672 | B1 * | 4/2003 | Tracy et al. | 235/383 |
| 6,732,934 | B2 * | 5/2004 | Hamilton et al. | 235/472.01 |

(Continued)

FOREIGN PATENT DOCUMENTS

EP 1120071 A1 * 8/2001

(Continued)

*Primary Examiner*—Daniel Walsh
(74) *Attorney, Agent, or Firm*—Buchanan Ingersoll & Rooney PC

(57) ABSTRACT

Systems and methods for providing discreet messaging are provided. Based on an identification of a customer and/or a product to be purchased, a message is selectively produced and provided in a discreet manner to the customer. The message can be visible and/or audible. The customer can be identified using Radio Frequency Identification (RFID) tags. The product to be purchased can be identified using scanned bar code information and/or RFID tags.

26 Claims, 6 Drawing Sheets

U.S. PATENT DOCUMENTS

| | | | | |
|---|---|---|---|---|
| 6,986,463 | B2 * | 1/2006 | Ludtke | 235/385 |
| 7,111,786 | B2 * | 9/2006 | Schmidt et al. | 235/462.45 |
| 7,114,656 | B1 * | 10/2006 | Garver | 235/462.46 |
| 7,257,373 | B2 * | 8/2007 | Halcrow et al. | 455/41.2 |
| 7,273,179 | B2 * | 9/2007 | Anson et al. | 235/462.46 |
| 2002/0016739 | A1 * | 2/2002 | Ogasawara | 705/22 |
| 2002/0040321 | A1 * | 4/2002 | Nicholson | 705/14 |
| 2002/0049656 | A1 * | 4/2002 | Lancos et al. | 705/35 |
| 2002/0050526 | A1 * | 5/2002 | Swartz et al. | 235/472.02 |
| 2002/0055875 | A1 * | 5/2002 | Schulze et al. | 705/14 |
| 2002/0065680 | A1 * | 5/2002 | Kojima et al. | 705/1 |
| 2002/0092912 | A1 * | 7/2002 | Hamilton et al. | 235/462.46 |
| 2002/0117544 | A1 * | 8/2002 | Wolf et al. | 235/383 |
| 2002/0140714 | A1 * | 10/2002 | Hoffman | 345/700 |
| 2002/0145047 | A1 * | 10/2002 | Goodwin, III | 235/462.46 |
| 2002/0158133 | A1 * | 10/2002 | Conzola et al. | 235/462.45 |
| 2002/0174025 | A1 * | 11/2002 | Hind et al. | 705/26 |
| 2002/0196126 | A1 * | 12/2002 | Eisenberg et al. | 340/10.2 |
| 2003/0009392 | A1 | 1/2003 | Perkowski | |
| 2003/0040332 | A1 * | 2/2003 | Swartz et al. | 455/553 |
| 2003/0071126 | A1 * | 4/2003 | Waxelbaum | 235/462.25 |
| 2003/0078840 | A1 | 4/2003 | Strunk et al. | |
| 2003/0115096 | A1 | 6/2003 | Reynolds et al. | |
| 2003/0132298 | A1 * | 7/2003 | Swartz et al. | 235/472.02 |
| 2003/0146280 | A1 * | 8/2003 | Acosta et al. | 235/454 |
| 2003/0234288 | A1 * | 12/2003 | Canipe et al. | 235/383 |
| 2004/0046027 | A1 * | 3/2004 | Leone et al. | 235/462.13 |
| 2004/0056091 | A1 * | 3/2004 | Overhultz et al. | 235/382 |
| 2004/0056101 | A1 * | 3/2004 | Barkan et al. | 235/472.03 |
| 2004/0111320 | A1 * | 6/2004 | Schlieffers et al. | 705/16 |
| 2004/0113791 | A1 * | 6/2004 | Salim et al. | 340/572.3 |
| 2004/0118930 | A1 * | 6/2004 | Berardi et al. | 235/492 |
| 2005/0006466 | A1 * | 1/2005 | Overhultz et al. | 235/383 |
| 2005/0108096 | A1 * | 5/2005 | Burger et al. | 705/14 |
| 2005/0212676 | A1 * | 9/2005 | Steinberg | 340/572.8 |
| 2005/0259797 | A1 * | 11/2005 | Swartz et al. | 379/93.12 |
| 2006/0006231 | A1 * | 1/2006 | Anson et al. | 235/435 |
| 2006/0074784 | A1 * | 4/2006 | Brown | 705/35 |
| 2006/0084448 | A1 * | 4/2006 | Halcrow et al. | 455/456.3 |
| 2006/0085270 | A1 * | 4/2006 | Ruckart | 705/21 |
| 2006/0092072 | A1 * | 5/2006 | Steiner | 342/46 |
| 2006/0109126 | A1 * | 5/2006 | Yegnan et al. | 340/572.1 |
| 2006/0175400 | A1 * | 8/2006 | Sweeney et al. | 235/383 |
| 2006/0176239 | A1 * | 8/2006 | Sweeney | 345/1.2 |
| 2006/0187040 | A1 * | 8/2006 | Sweeney | 340/572.1 |
| 2006/0202032 | A1 * | 9/2006 | Kricorissian | 235/435 |
| 2006/0208086 | A1 * | 9/2006 | Rudeen et al. | 235/472.01 |
| 2006/0223556 | A1 * | 10/2006 | Xu et al. | 455/502 |
| 2006/0238370 | A1 * | 10/2006 | Park et al. | 340/825.49 |
| 2006/0244601 | A1 * | 11/2006 | Nishimura | 340/572.4 |
| 2006/0249584 | A1 * | 11/2006 | Bobba et al. | 235/462.39 |
| 2006/0284727 | A1 * | 12/2006 | Steinke | 340/10.31 |
| 2007/0001814 | A1 * | 1/2007 | Steinke et al. | 340/10.31 |
| 2007/0051801 | A1 * | 3/2007 | Garver | 235/383 |
| 2007/0061208 | A1 * | 3/2007 | Goldman et al. | 705/14 |
| 2007/0063048 | A1 * | 3/2007 | Havens et al. | 235/462.46 |
| 2007/0063049 | A1 * | 3/2007 | Anson et al. | 235/462.46 |
| 2007/0069013 | A1 * | 3/2007 | Seifert et al. | 235/383 |
| 2007/0069016 | A1 * | 3/2007 | Garver | 235/383 |
| 2007/0080219 | A1 * | 4/2007 | Garver | 235/383 |
| 2007/0080220 | A1 * | 4/2007 | Garver | 235/383 |
| 2007/0080230 | A1 * | 4/2007 | Garver | 235/462.46 |
| 2007/0138268 | A1 * | 6/2007 | Tuchman | 235/383 |
| 2007/0152058 | A1 * | 7/2007 | Yeakley et al. | 235/462.01 |
| 2007/0188306 | A1 * | 8/2007 | Tethrake et al. | 340/10.51 |
| 2007/0268136 | A1 * | 11/2007 | Adamec et al. | 340/572.1 |
| 2008/0249884 | A1 * | 10/2008 | Knowles et al. | 705/23 |
| 2009/0039162 | A1 * | 2/2009 | Yen | 235/462.11 |

FOREIGN PATENT DOCUMENTS

| | | |
|---|---|---|
| WO | WO 93/16443 A1 | 8/1993 |

* cited by examiner

WIRELESS IDENTIFICATION BASED DISPLAY

BACKGROUND

The present invention relates to the output of messages based on wireless identification and/or optionally scanned bar code identification.

SUMMARY

A point of sale system is provided which comprises a processor, a display, an input which receives scanned bar code information and provides the scanned bar code information to the processor, an output which receives the scanned bar code information from the processor and provides the scanned bar code information to an electronic cash register, and a wireless information reader which receives information and provides the information to the processor. The processor outputs information on the display based on the scanned bar code information and/or information received by the wireless information reader.

A method for displaying promotional information at an electronic cash register comprises receiving a wireless identification signal and determining whether the wireless identification signal identifies a customer or a product. A message is displayed based on the wireless identification signal.

BRIEF DESCRIPTION OF THE DRAWING FIGURES

DETAILED DESCRIPTION

In accordance with exemplary embodiments, a system and method provide personalized messages at a point-of-sale terminal based on an identification of a customer and/or a product. Specifically, each customer is provided with a card which contains a mechanism which can be read wirelessly. The mechanism can be a radio frequency identification (RFID) tag. Products can also contain RFID tags. However, in instances where products do not contain RFID tags, exemplary embodiments provide for an identification of a product using scanned bar code information.

In accordance with exemplary embodiments, the message is provided to a customer in a discreet manner. For example, the message can be displayed in a manner in which only the customer to which the message is intended can view the message. Alternatively, or additionally, the message can include an audible portion which can be heard by the customer to which the message is intended or heard within a limited distance in the vicinity of the customer.

Figure 1A:
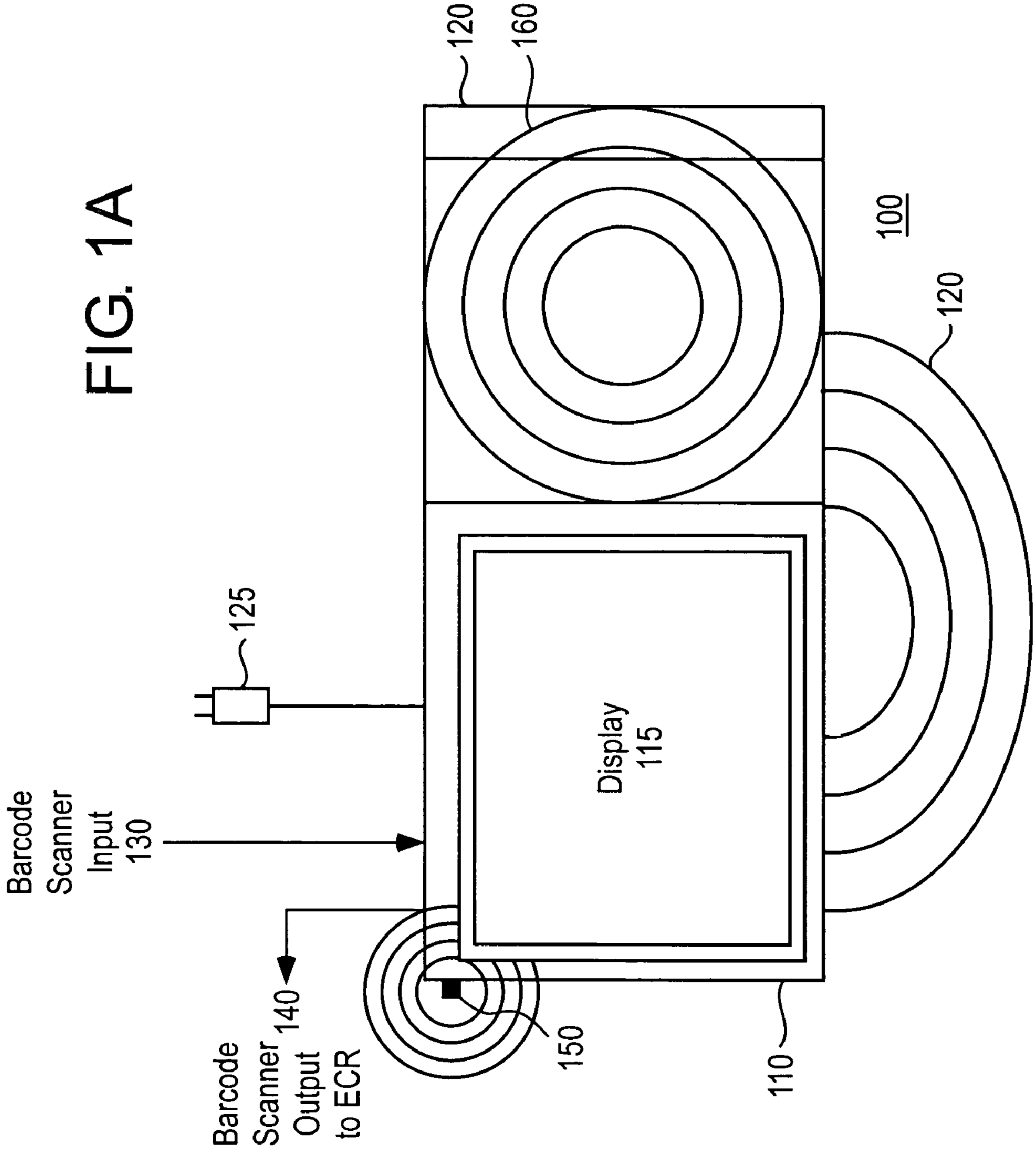
FIGS. 1A-1C illustrate portions of an exemplary point of sale system.
Figure 1B:
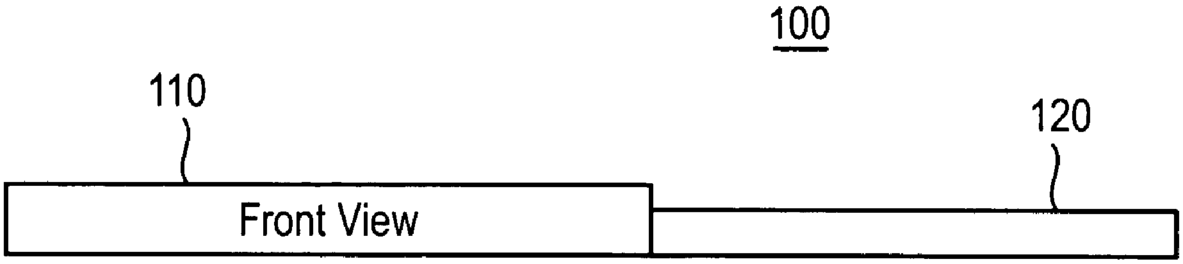
Figure 1C:
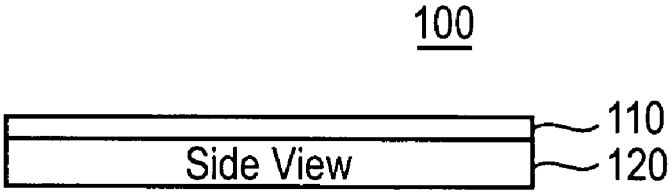

FIGS. 1A-1C illustrate portions of an exemplary point of sale system. The portion 100 is typically referred to in the art as a "change pad." Change pads are typically located at a point of sale system, and are used as a surface for signing credit card receipts. The exemplary change pad includes a first portion 110 and a second portion 120. The change pad 100 can have a transparent top window covering the display. The top window may be made of glass, coated glass, hard crystalline material such as sapphire or quartz, clear polymer or coated polymer, or other transparent materials resistant to scuffing and breakage. The window may be embedded in a resilient material, such as rubber or other elastomers, to absorb shock and assist in sealing the window from liquid spills. Additionally, the window may be coated with a textured transparent surface.

Portion 110 includes display 115. In accordance with exemplary embodiments, display 115 can be a touch screen display allowing a customer to interact with the system, for example allowing a customer to select a particular promotion from a list of promotions. Alternatively, or additionally, the customer interaction can be performed using push button switches (not illustrated).

In order to provide discreet messaging, the display 115 can incorporate directional viewing properties such as those typically found in LCD displays. Moreover, the display 115 can incorporate lenses, such as lenticular arrays or holographic optical elements to manage the viewing angle. Other types of directional viewing materials, such as the microreplicate limited viewability angle materials manufactured by 3M Company, may be incorporated into the window to provide discreet messaging. In one embodiment, the display screen and its directional viewability lens can be segmented to simultaneously provide one message viewable only by the consumer and another message viewable only by the retail clerk. The directional lens can be in the form of holographic optical elements, and the segmentation can be in the style of a mosaic or lenticular array lens. If a segmented display is provided, the messages provided to the consumer and the retail clerk, based on the identification of the consumer and/or the product, can be different messages.

The change pad includes a 120 volt to 12 volt transformer 125, a bar code scanner input 130, a bar code scanner output 140, and a wireless communications unit 150. Transformer 125 is used to provide the appropriate amount of power required by change pad 100. Although a particular type of transformer is described, any transformer which provides the appropriate voltage required to operate the system can be employed. A bar code scanner typically interfaces directly with an electronic cash register. In accordance with exemplary embodiments, the bar code scanner interfaces with the change pad 100 via bar code scanner input 130. To provide the scanned bar code information to an electronic cash register, bar code scanner output 140 is provided. By providing the bar code scanner input and output, a preferred embodiment can use the scanned bar code information to identify the product without interfering with the normal operation of the bar code scanner and its interaction with an electronic cash register.

Wireless communication unit 150 is employed for transmitting and receiving information for the operation of change pad 100. In an exemplary embodiment, wireless communication unit 150 operates in accordance with the IEEE 802.11b communication standard, although other wireless communication protocols, such as IEEE 802.11g, or wired Ethernet connections may be used.

The change pad 100 also includes a first and second antenna, which respectively produce wireless reading fields 160 and 170. Wireless reading field 160 reads information directly above the change pad 100 and wireless reading field 170 reads information from customers and/or products which are approaching the electronic cash register and the change pad 100. In accordance with exemplary embodiments, the antennas which produce wireless read fields 160 and 170 are connected to wireless information readers which read RFID tags.

Wireless read fields 160 and 170 can be either magnetic fields or electrical fields depending upon the type of RFID tags to be read. For inductively coupled RFID tags, wireless read fields 160 and 170 are magnetic fields. The RFID tag receives the magnetic energy of the magnetic field and modulates the magnetic field. The wireless information reader reads the modulated magnetic field to identify the RFID tag. The system correlates the identification of the RFID tag with a customer and/or product based upon previously stored information. Capacitively coupled RFID tags operate in a manner similar to the inductive coupled RFID tags except that the RFID tag modulates the electric field, and the modulated electric field is used to identify the RFID tag.

With respect to wireless reading field 170, situations may occur where there are more than one RFID tag present in this field. However, it is desirable that the message is based on only the RFID tag most proximate to the point of sale system. To address these situations, exemplary embodiments employ logic which can detect the proximity of the read RFID tags. Specifically, based upon the strength of the signal read from the RFID tags, the system can determine that the strongest signal corresponds to the RFID tag most proximate to the point of sale system. Additionally, the system can employ a signal strength threshold to control how close an RFID tag must be before a message is presented. For example, based upon routine testing it can be determined that a predetermined signal strength corresponds to a predetermined distance from the point of sale terminal. This predetermined distance is selected to ensure that the message is provided only to those for whom the message is intended.

Figure 2:
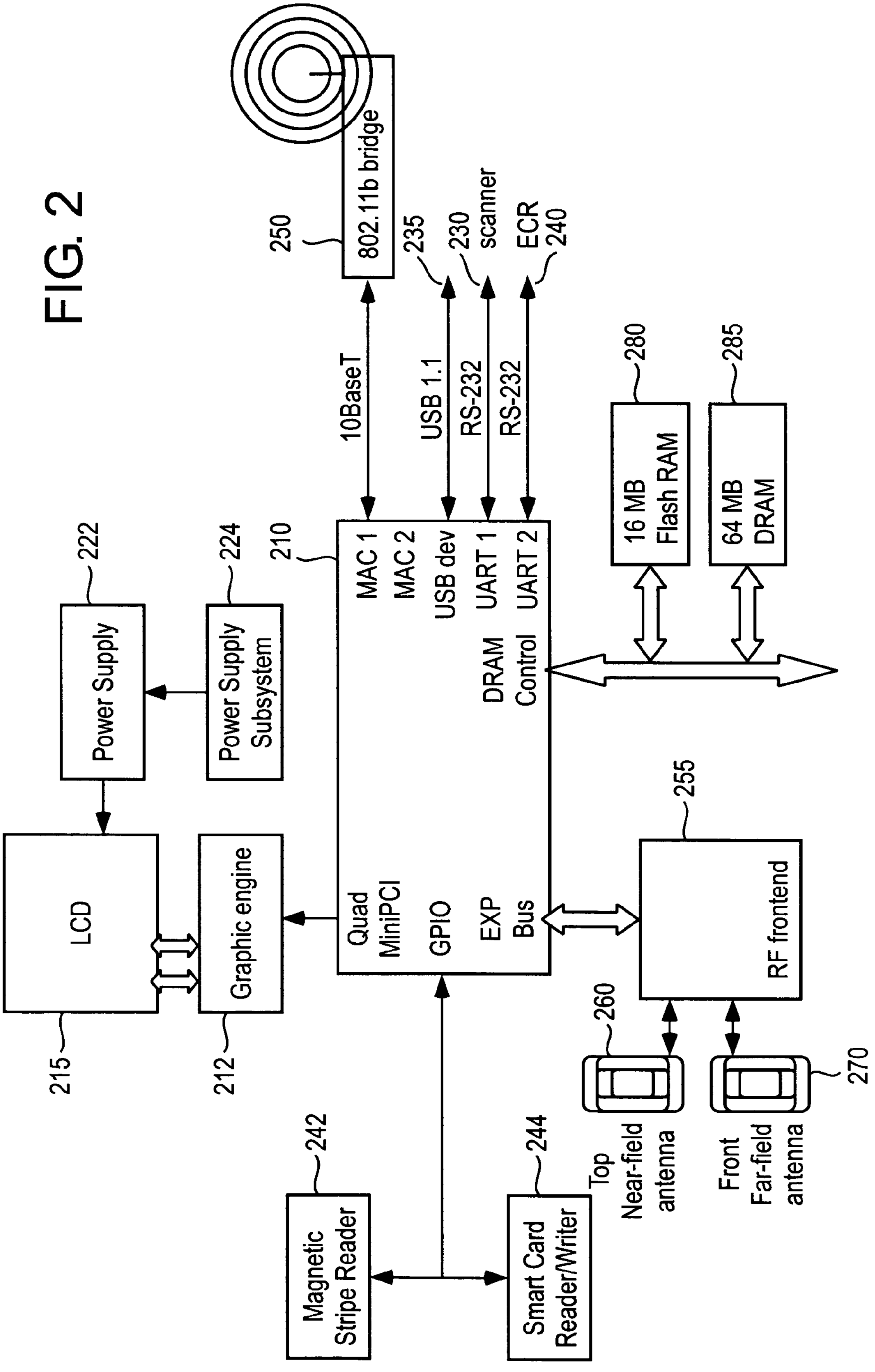
FIG. 2 illustrates components of the portion of the exemplary point of sale system in accordance with an embodiment.

FIG. 2 illustrates components of the change pad in accordance with one embodiment. In accordance with exemplary embodiments the change pad 100 is controlled by processor 210. Processor 210 can be, for example, an Intel X-scale IXP 420 266 MHz core microprocessor. The microprocessor 210 controls display 115. Specifically, display 115 can comprise graphic engine 212 and liquid crystal display (LCD) 215. The LCD can be powered by power supply 222 via power supply subsystem 224. Power supply subsystem 224 also provides power to all of the other elements of the change pad. In accordance with exemplary embodiments the LCD can be a 10 inch SVGA TFT (super video graphics array thin film transistor) LCD with a high output CCFL (cold cathode fluorescent lamps) backlight. To drive such a display, in exemplary embodiments, graphic engine 212 can be an 800×600×24 graphic engine. It will be recognized that the present embodiments are not limited to the use of a particular type of display or graphics engine. The microprocessor 210 receives scanned bar code information from bar code scanner via RS-232 interface 230, and provides the scanned bar code information to an associated electronic cash register via RS-232 interface 240.

The operational program for processor 210 is contained within memory systems 280 and 285. Although particular types of memory and size of memories are illustrated in FIG. 2, other types of memories and sizes of memories can be employed with exemplary embodiments. In order to receive information from a customer and/or product database, wireless bridge 250 is provided.

The wireless information reading subsystem comprises RF front end 255, top near-field antenna 260 and front far-field antenna 270. In accordance with exemplary embodiments RF front end 255 is a dual channel ThingMagic AutoID RF front end. The top near-field antenna 260 produces the reading field 160 of FIG. 1, and front far-field antenna 270 produces the reading field 170 of FIG. 1. USB (universal serial bus) 1.1 communication interface 235 is provided for connection of additional components. For example, the USB 1.1 communication interface 235 can be used to connect a camera or biometric identity device to identify a customer. Additionally, this interface can be used for connection of a memory device, such as a USB flash RAM (random access memory) memory. The interface can also be used for connection of a local configuration or diagnostic computer.

A magnetic stripe reader 242 and/or a Smart Card Reader/Writer 244 is connected to the processor 210 via a general purpose input/output (GPIO) interface. The push buttons described above in connection with FIG. 1 can connect to the processor 210 via the GPIO, or any other type of interface.

Figure 3:
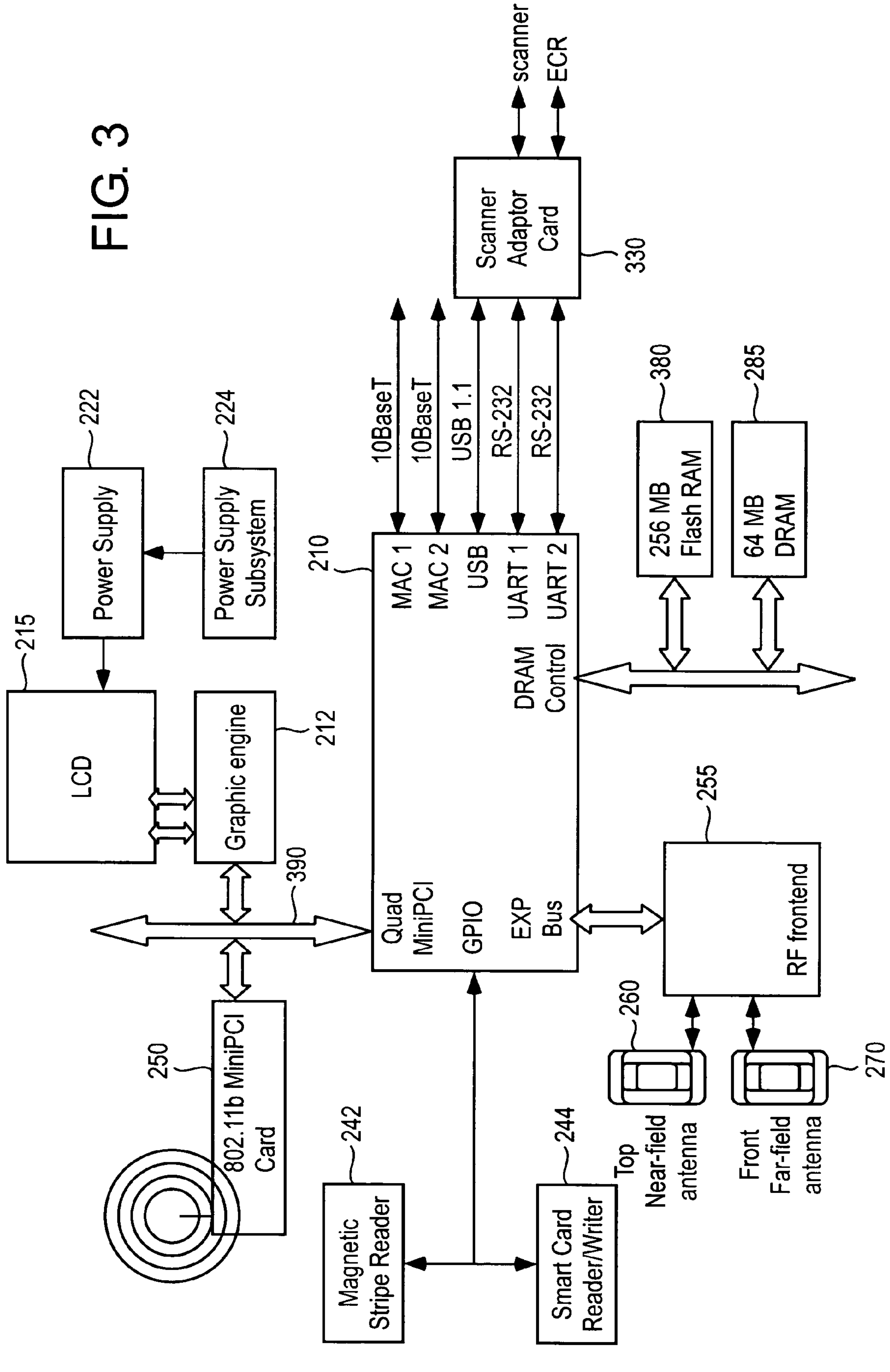
FIG. 3 illustrates components of the portion of the exemplary point of sale system in accordance with another embodiment.

FIG. 3 illustrates an exemplary change pad in accordance with another embodiment. The embodiment illustrated in FIG. 3 contains many of the same components arranged as described above in connection with FIG. 2, and hence, a detailed description of these components can be found above. For bar code scanners and electronic cash registers which do not employ a RS-232 interface, a scanner adapter card 330 can provide an interface between the processor 210, the scanner and the electronic cash register. Additionally, instead of employing the built-in medium access control (MAC) interface, the 802.11b bridge can be provided in the form of a mini-PCI card which interfaces with the processor 210 via bus 390. Additionally, as illustrated by flash RAM 380, additional memory can be provided for the operation of the system.

Figure 4:
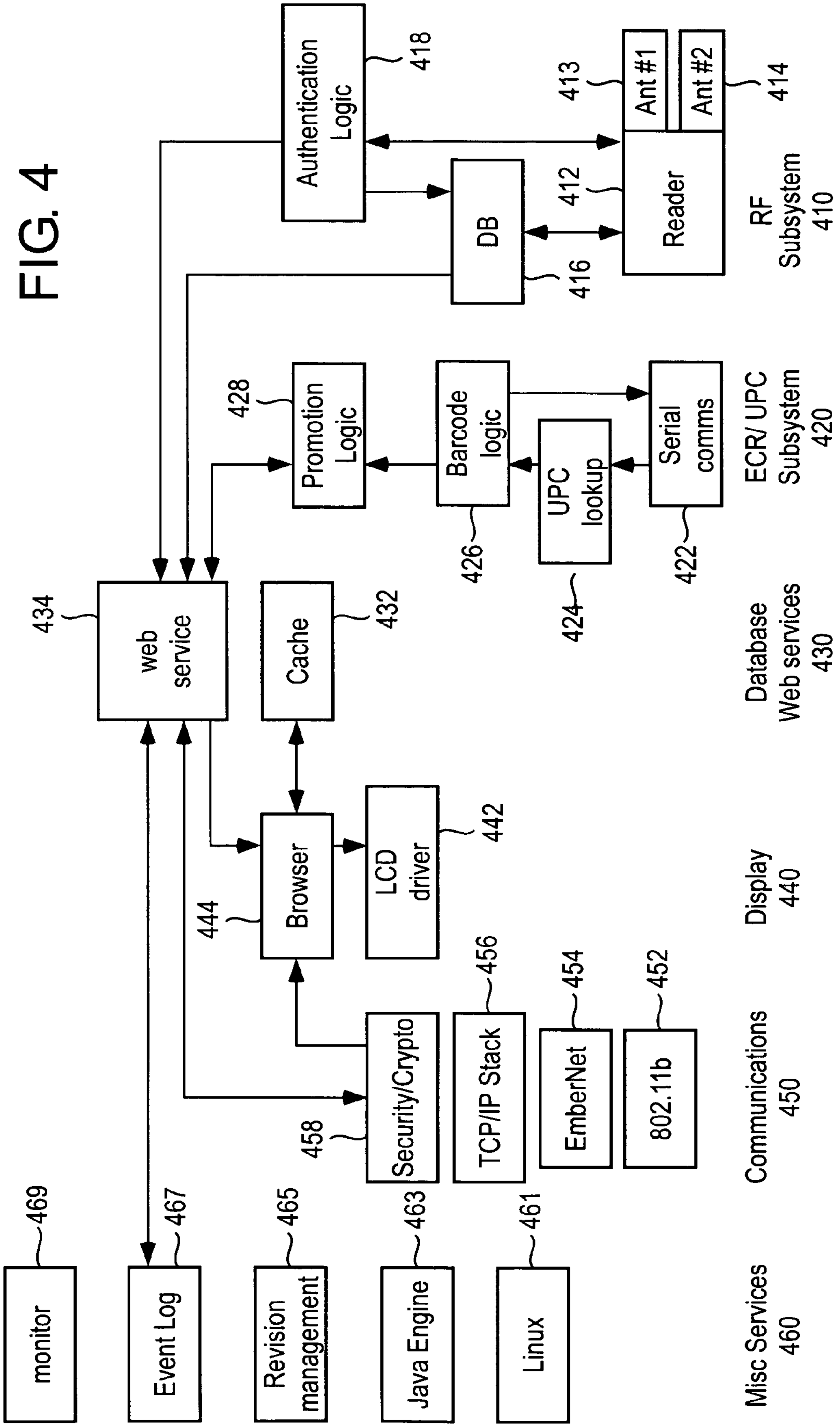
FIG. 4 illustrates the logic components of the portion of the exemplary point of sale system and supporting systems in accordance with an exemplary embodiment.

FIG. 4 is a software block diagram of the change pad and supporting systems in accordance with exemplary embodiments. The logic components are broken down into six categories, the RF subsystem 410, the electronic cash register-universal code subsystem 420, the database web services subsystem 430, the display subsystem 440, the communications subsystem 450 and the miscellaneous services subsystem 460.

In accordance with exemplary embodiments, the database 416 can be the Savant relational database system designed by MIT. The authentication logic 418 authenticates the information read by wireless information reader 412 from wireless information tags on cards and/or products.

The serial communication interface 422 controls the signal between the RS-232 interfaces and the Universal Product Code (UPC) trigger logic and coupon generator 426. The UPC trigger logic and coupon generator 426 includes UPC lookup 424. The UPC trigger logic and coupon generators 426 compare scanned bar code information to stored bar code information to determine whether a promotion should be provided to a customer. The UPC trigger logic and coupon generator uses the scanned bar code information to determine whether a virtual coupon should be provided to the associated electronic cash register. Promotion logic 428 interfaces between the UPC trigger logic and coupon generator 426 and web service 434. The promotion logic 428 can automatically generate a promotion for display in browser 444 using JPEG (Joint Photographic Experts Group) image files, predefined fonts, and/or predefined text. As a result of the promotion logic, the use of the virtual coupon and thus the resulting price reduction can be provided to a manufacturer or vendor of the product, wherein in turn, a payment for the price reduction can be sent from the manufacturer or vendor.

In accordance with exemplary embodiments, web service 434 can be a Bamboo/SQL (Structured Query Language) service (such as produced by ThingMagic), an Apache web server or other lightweight web service engine. Web service 434 accesses open file system 432 for generation of the information to be displayed in browser 444. Open file system 432 includes a browser cache and an encrypted file system. Database web service subsystem 430 includes cache 432 and web service 434.

The display is driven by a graphical user interface display driver 442 and a video buffer (not shown). The video buffer can be, for example, a 24 bit XVGA (Extended Video Graphics Array) video buffer.

Access to information from the Internet is provided by TCP/IP (Transmission Control Protocol/Internet Protocol) protocol stack 456 and authentication cryptographic component 458 in a conventional manner.

The software runs on a Linux Operating System 461. The Linux Operating System 461 provides the basic operating system functionally for the system, including memory management, task management, file system services and control of input/output devices. Other small kernel network capable, multitasking operating systems, such as MICROSOFT CE.NET, Radisys's 059, or Windriver System's Vxworks can be employed. The Java Engine 463 is the virtual machine for execution of Sun Microsystem's Java standard code, such as J2ME VM. Revision management component 465 maintains a listing of the version of each software component employed by the system. The event log 467 is a timed stamped log service where unusual events or errors are logged in sequence and saved to the file system for future review. The monitor 469 provides a real-time view of system operation and resources, and provides an HTML accessible web page of this information accessible through the web service engine.

Figure 5:
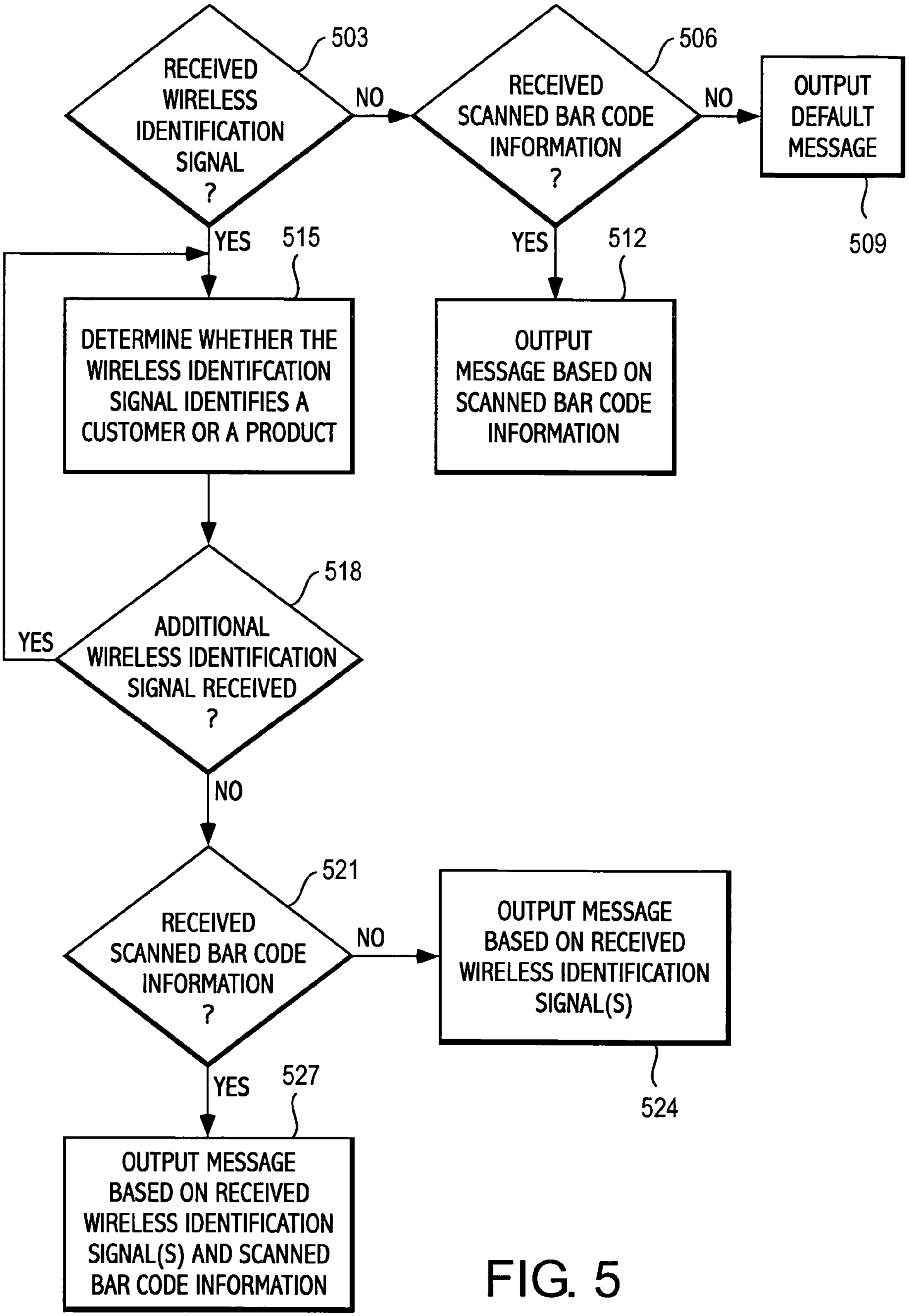
FIG. 5 illustrates an exemplary embodiment of a method of using an embodiment of a point of sale system.

FIG. 5 illustrates an exemplary method of using a preferred point of sale system. Initially, it is determined whether a wireless identification signal has been received (step 503). If a wireless identification signal has not been received ("NO" path out of decision step 503), then it is determined whether scanned bar code information has been received (step 506). If it is determined that scanned bar code information has not been received ("NO" path out of decision step 506), then a default message is output (step 509). If, however, scanned bar code information is received ("YES" path out of decision step 506), then a message is output based on the scanned bar code information (step 512). The message can be an audio and/or a visual message. The virtual coupon is output to an associated electronic cash register.

If it is determined that a wireless identification signal has been received ("YES" path out of decision step 503), then it is determined whether the wireless identification signal identifies a customer or a product (step 515). After it has been determined whether the wireless identification signal identifies a customer or product, it is determined whether an additional wireless information signal has been received (step 518). If an additional wireless identification signal has been received ("YES" path out of decision step 518), then it is determined whether the wireless identification signal identifies a customer or a product (step 515). As can be seen from the feedback loop from step 518 to step 515, exemplary embodiments can employ wireless identification signals from both a customer and/or one or more products.

If it is determined that no additional wireless identification signals have been received ("NO" path out of decision step 518), then it is determined whether scanned bar code information has been received (step 521). If scanned bar code information is not received ("NO" path out of decision step 521), then a message is output based on the received wireless identification signal (step 524). If, however, scanned bar code information is received ("YES" path out of decision step 521), then a message is output based on the received wireless identification signal and scanned bar code information (step 527).

Although the present invention has been described above in connection with particular exemplary embodiments, the present invention can include other variations. For example, in addition to, or as an alternative to, the use of a display, an audible message can be provided to the consumer. The audible message can be used with a localized sound projection system. The localized sound projection system can employ parabolic or spherical reflector localizers or hemispheric domes which are commercially available as "Localizers" products produced by Brown Innovations in Chicago, Ill. Alternatively, or additionally, ultrasonic parametric array sound localizers, such as those produced by Holosonic Research Labs, Inc. in Watertown, Mass. or the American Technology Corporation in San Diego, Calif. may be employed. As an alternative, emitters of the ultrasonic parametric array can be placed into the area surrounding the change pad such that their audible area can be pre-focused into the same area into which the visual display is optimized. The pre-focusing can be performed by phase shifting the emitters to create a non-normal beam and/or by tilting the emitters in the desired direction.

As described above, the type of message provided is based on the identification of a customer and/or a product. Accordingly, the system may be provided to the retail establishment by a particular company. The particular company can then display messages intended to direct the customer towards the particular company's products. For example, if it is determined that the customer is about to purchase a product from a competitor, the message can inform the customer that a discount will be provided if the customer purchases a similar product from the particular company.

One embodiment of a point of sale system can be a cigarette kiosk. For example, in a cigarette kiosk, a bar code for a cigarette package can be scanned to an electronic cash register while a wireless information reader can read a loyalty card with an RFID tag of a customer possessing the cigarette package. Using information from the card and/or the bar code, customer specific cigarette promotional information, such as specifying the customer and/or a cigarette brand by name, can be sent to the customer, by means of a display in the kiosk. The information can be provided discreetly with increased privacy by means of a limited viewing angle display or a limited area audible transmission. By providing the information discreetly, the customer can receive customer and/or cigarette brand specified information, while other people around the customer will not necessarily be exposed to the information provided to the customer.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A point of sale system, comprising:

a processor;

a display;

an input which receives scanned bar code information and provides the scanned bar code information to the processor;

a scanner output which receives the scanned bar code information from the processor and provides the scanned bar code information to an electronic cash register;

a first wireless information reader which receives first information and provides the first information to the processor; and a second wireless information reader that receives second information, wherein the first wireless information reader and the second wireless information reader have non-overlapping read fields that are activated to read the first and second information simultaneously, and wherein the processor outputs information on the display based on the scanned bar code information and/or the first and second information received by the first and second wireless information readers, respectively.

2. The system of claim 1, wherein the first wireless information reader reads radio frequency identification (RFID) tags.

3. The system of claim 1, wherein the first information received by the first wireless information reader identifies a customer.

4. The system of claim 1, wherein the information received by the first wireless information reader identifies a product.

5. The system of claim 4, wherein the product is a cigarette package or carton of cigarette packages.

6. The system of claim 1, wherein information is output on the display based on the scanned bar code information and the first information received by the first wireless information reader.

7. The system of claim 1, wherein the first and second wireless information readers are antennas which receive wireless information and provide the wireless information to a wireless information processor.

8. The system of claim 1, wherein the display has a predetermined viewing angle, wherein the predetermined viewing angle limits the viewing of the information output on the display to a customer directly in front of the display.

9. The system of claim 1, wherein the display has first and second output fields, the first output field directed towards a customer and the second output field directed towards an operator of the electronic cash register.

10. The system of claim 9, wherein the first and second output fields are obtained using a holographic lens.

11. The system of claim 1, further comprising an audio output for providing audio based on the scanned bar code information or the first information received by the first wireless information reader.

12. The system of claim 11, wherein the audio is audible within an area in front of the electronic cash register.

13. The system of claim 1, wherein the output provides additional information to the electronic cash register based on the received scanned bar code information or the first information received by the first wireless information reader.

14. The system of claim 13, wherein the additional information is promotional information based on an identification of a particular customer or of a particular product.

15. The system of claim 1, wherein the output for providing scanned bar code information also outputs bar code information representing a coupon to the electronic cash register.

16. A method for displaying promotional information at an electronic cash register, comprising:

receiving a first wireless identification signal and a second wireless identification signal simultaneously through a wireless read field;

determining that the first wireless identification signal was received from a source closer to the electronic cash register than a source of the second wireless identification signal;

comparing the first wireless identification signal to customer and product information stored in a database to determine whether the first wireless identification signal identifies a customer or a product; and displaying a message on a display based on the first wireless identification signal to the customer.

17. The method of claim 16, wherein the message is displayed with a predetermined viewing angle, wherein the predetermined viewing angle limits the viewing of the information output on the display to a customer directly in front of the display.

18. The method of claim 16, further comprising:

receiving bar code information through a scanner input, wherein the displayed message is also based on the received bar code information.

19. The method of claim 18, further comprising:

outputting audio based on the first or second wireless identification signal or the received bar code information.

20. The method of claim 18, further comprising:

outputting bar code information representing a coupon based on the received bar code information.

21. The method of claim 16, wherein the determining determines that at least one of the first and second wireless identification signals identifies a product, and wherein the product is a cigarette package or carton of cigarette packages.

22. A method for displaying promotional information at an electronic cash register, comprising:

generating a first wireless read field and a second wireless read field simultaneously, wherein the first and second wireless read fields are non-overlapping;

receiving a first wireless identification signal through the first read field and a second wireless identification signal through the second read field;

comparing the first wireless identification signal and the second wireless identification signal to customer and product information stored in a database to determine whether the first or second wireless identification signal identifies a customer or a product;

displaying a message on a display based on the first or second wireless identification signal to the customer;

generating a coupon based on the first or second wireless identification signal;

providing the coupon to the electronic cash register; and reducing a price of a product based on the coupon.

23. The method of claim 22, wherein the generating a coupon comprises generating a virtual coupon.

24. The method of claim 22, comprising:

providing the price reduction to a manufacturer or vendor of the product; and providing payment for the price reduction from the manufacturer or vendor to the electronic cash register.

25. The system of claim 1, comprising:

a comparator that compares a signal strength of the first wireless identification signal to a signal strength of the second wireless identification signal to determine whether a first wireless identification signal was received from a source closer to the electronic cash register than a source of the second wireless identification signal.

26. The method of claim 22, comprising:

comparing a signal strength of the first wireless identification signal to a signal strength of the second wireless identification signal; and determining that the first wireless identification signal was received from a source closer to the electronic cash register than a source of the second wireless identification signal based on a comparison result.

* * * * *